United States Patent [19]

Olesen

[11] Patent Number: 4,661,323

[45] Date of Patent: Apr. 28, 1987

[54] RADIATING SLEEVE FOR CATALYTIC REACTION APPARATUS

[76] Inventor: Ole L. Olesen, 21 Brewster Rd., South Windsor, Conn. 06074

[21] Appl. No.: 721,241

[22] Filed: Apr. 8, 1985

[51] Int. Cl.[4] ............................. B01J 7/00; B01J 8/06
[52] U.S. Cl. .................................... 422/197; 165/184; 422/196; 422/311
[58] Field of Search ............................... 165/154–156, 165/184; 422/196, 197, 311

[56] References Cited

U.S. PATENT DOCUMENTS

| | | | |
|---|---|---|---|
| 2,908,486 | 10/1959 | Thornburg | 165/156 |
| 3,898,428 | 8/1975 | Dye | 165/156 |
| 4,044,797 | 8/1977 | Fujie et al. | 165/184 |
| 4,098,589 | 7/1978 | Buswell et al. | 422/197 |
| 4,203,950 | 5/1980 | Sederquist | 422/197 |
| 4,248,179 | 2/1981 | Bonner | 165/184 |

FOREIGN PATENT DOCUMENTS 1111654 7/1961 Fed. Rep. of Germany ...... 165/156

*Primary Examiner*—Barry S. Richman
*Assistant Examiner*—William R. Johnson
*Attorney, Agent, or Firm*—Stephen E. Revis

[57] ABSTRACT

Tubular catalytic reactors within a furnace are each surrounded by a radiator having an inner cylindrical surface spaced from the reactor defining a flow path for the furnace gases. The inner surface of the radiator has a plurality of adjacent helical channels formed therein extending the length of the conduit. Heat from the furnace gases traveling through the flow path is picked up by the radiators by convection and radiated to the reactor. The helical grooves improve heat transfer efficiency and circumferential uniformity of heating with minimum pressure drop; and they prevent the cut off of heat to localized areas of the reactor in case of contact between the reactor and radiator walls.

5 Claims, 4 Drawing Figures

RADIATING SLEEVE FOR CATALYTIC REACTION APPARATUS

BACKGROUND OF THE INVENTION

1. Field of the Invention

This invention relates to reaction apparatus such as catalytic reaction apparatus for producing product gases from a feedstock.

2. Description of the Prior Art

High efficiency catalytic reaction apparatus is well known in the art, such as represented by commonly owned U.S. Pat. No. 4,098,588 "Multi-Tube Catalytic Reaction Apparatus" by R. F. Buswell, R. A. Sederquist, and D. J. Snopkowski, incorporated herein by reference. That patent describes compact reaction apparatus, such as for producing hydrogen from a hydrocarbon feedstock. Catalyst filled tubular reactors are disposed within a furnace. The furnace provides the heat for the reaction taking place within the reactors. The hot gases generated within the furnace are passed uniformally around the reactors as they travel to the furnace exhaust conduit. In the embodiment shown in FIGS. 5 and 6 thereof, a plurality of axially extending triangular-like flow directors are disposed between adjacent reactors to reduce the furnace volume between the reactors and to force the flow of hot gases into closer proximity to the reactors, thereby increasing heat transfer effectiveness. The flow directors are provided with a plurality of integral fins extending the length thereof. The fins take the place of thermally conductive particles or packing material described in another embodiment of the patent. The fins, like the packing material which they replace, are for the purpose of enhancing convection, conduction and radiation of the heat from the flowing furnace gases into the reactor tubes. As further discussed in the patent, uniformity of flow of hot gases around each reactor, as well as amongst the reactors, is important to maximize thermal heat transfer efficiencies and to avoid local hot spots and temperature gradients around the circumference of the reactor tubes.

The present invention describes a compact, multi-tube catalytic reaction apparatus having a differently designed flow director, namely, a helically grooved conduit, for accomplishing the foregoing objectives. The flow director of the present invention may also be particularly useful in a single tube catalytic reaction apparatus for which the flow diverters of the Buswell et al patent are not well suited.

DISCLOSURE OF INVENTION

An object of the present invention is to improve the transfer of heat into a catalytic reaction tube from a fluid flowing around the tube.

According to the present invention, a tubular reactor within a furnace is surrounded by a conduit having an inner cylindrical surface spaced from the reactor outer surface forming an axially extending annular space between the conduit and the reactor through which hot furnace gases flow, the inner surface of the conduit including a plurality of helical channels formed therein extending the length of the conduit, which channels extend around a substantial portion of the internal circumference of the conduit, and wherein the area of the channels in any cross-section taken perpendicular to the axis of the conduit is a substantial percent of the total cross-sectional flow area between the conduit and the reactor at the location of the cross-section.

The channels in the surface of the conduit provide an increased surface area as compared to a smooth cylindrical inner surface thereby increasing the radiating capability of the conduit and also increasing the conduit's ability to pick up heat by convection from the hot gases flowing adjacent thereto. Such heat is subsequently transferred to the reactor tube by radiation from the conduit. Hereinafter the conduit is referred to as a radiator since that is one of its primary functions.

The helical grooves in the radiator carry the furnace gases circumferentially around the reactor as the gases move axially along the length of the reactor and provide uniform heat transfer to the reactor by radiation and convection. Even if the radiator happens to contact the surface of the reactor, such as due to loose tolerances or out of roundness, the helical grooves still carry the hot gases into close proximity with the contacted portions, thereby providing at least some heat to that area of the reactor to minimize circumferential heat maldistribution and hot spots within the reactor. The radiator inner wall can, therefore, be relatively closely spaced from the reactor outer wall as long as the cross-sectional area of the grooves is large enough to carry the gas flow without exceeding pressure drop limitations.

Helically grooved tubular radiators are particularly well suited for use in the compact multi-tube catalytic reaction apparatus of U.S. Pat. No. 4,098,588 (discussed above) in place of the finned flow directors shown and described therein.

It is to be noted that the prior art describes tubes for use in heat exchangers, such as air conditioners, freezers and boilers, which tubes have helical grooves formed in either their inner or outer cylindrical surface. See U.S. Pat. No. 4,044,797. The grooves are provided for increasing the heat transfer area and the heat transfer rate across the wall of the tube without increasing the pressure loss caused by fluid flowing through the tube. Other U.S. patents representative of heat transfer tubes which separate fluids at different temperatures and wherein the heat from a fluid on one side of the tube is to be transferred to the fluid on the other side of the tube are: U.S. Pat. Nos. 3,309,072; 3,370,635; 2,930,405; 2,998,962; 3,267,563; 3,267,564; and 3,284,170. It should be recognized that the radiators of Applicant's invention are not heat transfer tubes since heat is not transferred across the walls thereof, as will become apparent from the following description.

The foregoing and other objects, features and advantages of the present invention will become more apparent in the light of the following detailed description of preferred embodiments thereof as illustrated in the accompanying drawing.

DESCRIPTION OF THE PREFERRED EMBODIMENTS

Figure 1:
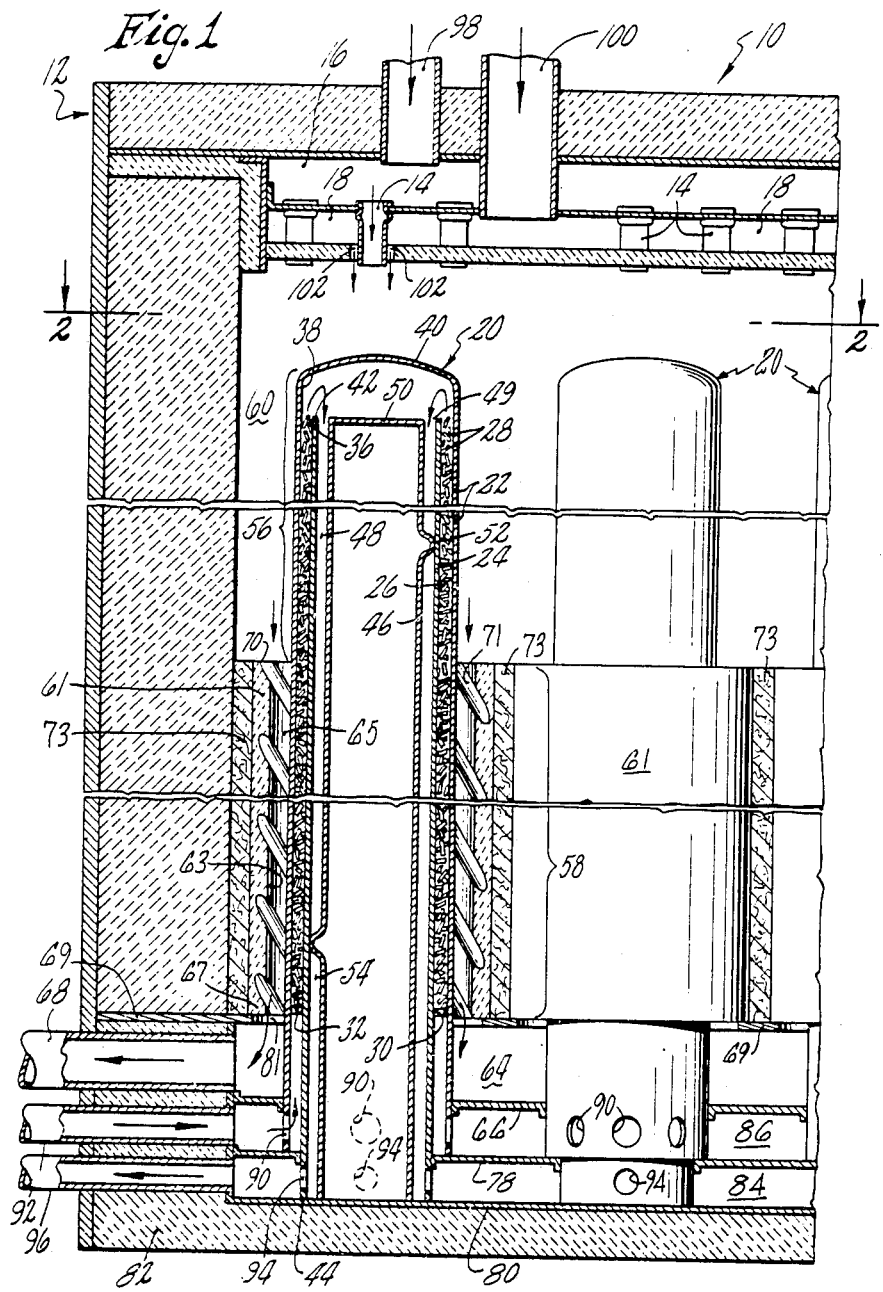
FIG. 1 is a fragmentary, vertical, cross-sectional view of catalytic reaction apparatus according to the present invention.
Figure 2:
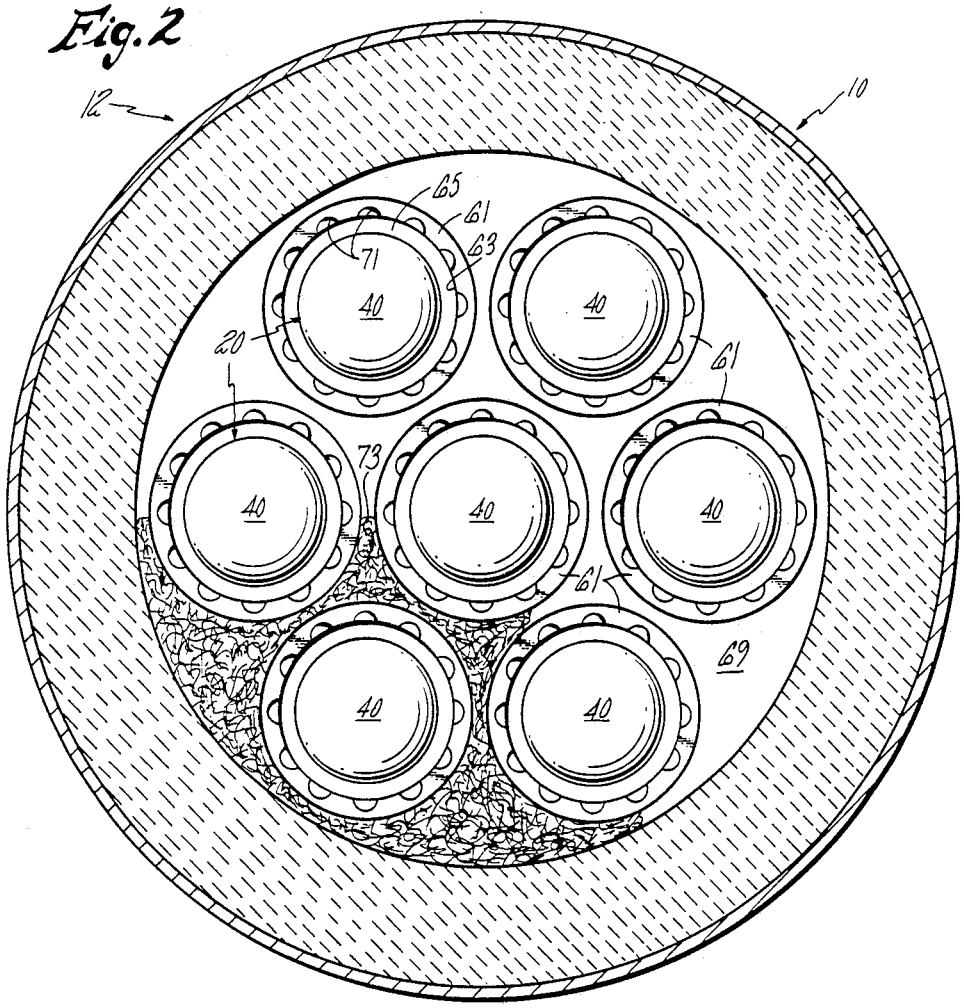
FIG. 2 is a cross-sectional view of the apparatus of FIG. 1 taken substantially along the line 2—2 of FIG. 1.

Consider, as an exemplary embodiment of the present invention, the catalytic reaction apparatus 10 of FIGS. 1 and 2. In this embodiment, the apparatus is for the purpose of steam reforming a reformable hydrocarbon fuel in the presence of a suitable catalyst in order to produce hydrogen. The apparatus 10 comprises a furnace 12 including burner nozzles 14, a burner fuel manifold 16, and an air manifold 18. Disposed within the furnace 12 is a plurality of closely packed tubular reactors 20.

Each reactor 20 comprises an outer cylindrical wall 22 and an inner cylindrical wall of center tube 24 defining an annular reaction chamber 26 therebetween. The reaction chamber 26 is filled with steam reforming catalyst pellets 28 which are supported on a screen 30 disposed at the inlet 32 of the reaction chamber. Any suitable steam reforming catalyst, such as nickel, may be used to fill the reaction chamber from its inlet 32 to its outlet 36. The cylinder which is defined by the outer wall 22 is closed at its upper end 38 by an end cap 40. The center tube 24 has an upper inlet end 42 and a lower outlet end 44. The inlet end 42 terminates below the end cap 40 such that the center tube is in gas communication with the outlet 36 of the reaction chamber 26.

Disposed within the center tube is a cylindrical plug 46 which has an outer diameter somewhat smaller than the inner diameter of the center tube thereby defining an annular regeneration chamber 48 therebetween having an inlet 49. The plug 46 may be a solid rod, but in this embodiment is a tube which is blocked by an end cap 50 at one end thereof such that reaction products exiting the reaction chamber 26 must flow around the plug 46 through the regeneration chamber 48. Spacing between the plug 46 and the center tube 24 is maintained by dimples 52 in the plug wall.

For the purposes of the reactors of this exemplary embodiment, the function of the regeneration chamber 48 is to return heat from the reaction products leaving the outlet 36 back into the catalyst bed of the reaction chamber 26; therefore, with regard to this embodiment, the outlet 54 of the regeneration chamber 48 is considered to be located adjacent the inlet 32 of the catalyst bed rather than at the outlet end 44 of the center tube, despite the fact that the actual annulus defined between the plug 46 and the center tube 24 extends to the outlet end 44. The arrangement shown in FIG. 1 provides some preheating of the process fuel before it enters the catalyst bed. Also, in this embodiment the plug 46 extends the entire length of the reaction chamber such that the inlet 49 of the regeneration chamber is adjacent the outlet 36 of the reaction chamber; although this is preferred for maximum regeneration, the regeneration chamber inlet may be located anywhere between the inlet and outlet of the reaction chamber by using a shorter plug.

Note that the regeneration chamber 48 is substantially isolated from the hot furnace gases. For maximum overall reactor efficiency it is important to prevent the heat energy of the furnace gas from heating the reaction products within the regeneration chamber. It is also important to avoid the burning of additional fuel or hydrogen within the regeneration chamber. Only sensible heat already in the reaction products at the outlet 36 is transferred to the reaction chamber.

Each reactor 20 may be considered to comprise an upper portion 56 and a lower portion 58. The upper portion 56 is disposed within what is hereinafter referred to as the burner cavity 60. The cavity 60 is that volume of the furnace 12 within which actual combustion of the fuel and air fed into the furnace takes place. This volume is characterized by very high temperatures, considerable radiant heating as well as convective heating of the reactors 20, an axial (i.e., in the direction of the axis of the reactors 20) as well as radial mixing of the gases therein.

Surrounding the lower portions 58 of each reactor is a tubular radiator 61 coaxial with the reactor 20 and having an inner surface 63 spaced therefrom defining an axially extending annular volume 65 therebetween. The annular volumes 65 around each reactor are hereinafter referred to as the enhanced heat transfer portion of the furnace. The radiators 61 are attached by suitable means at their lower ends 67 to a solid plate 69 having holes 81 therethrough through which the reactors 20 pass. The volume or space between the radiators 61 is filled with a packed fibrous material 73 such as alumina/silica fibers.

Referring to FIG. 1, a sufficient volume of the furnace around the upper portions 56 of the reactors 61 remains empty for permitting combustion of the fuel and air within the furnace. The enhanced heat transfer portion or volumes 65 communicate with a manifold 64 between a plate 66 and the plate 69. An exhaust conduit 68 is connected to the manifold 64. In addition to the plates 69 and 66, plates 78 and 80 also extend across the furnace and define manifolds therebetween. The plate 80 rests on the bottom wall 82 of the furnace. The plates 78 and 80 define a reaction products manifold 84 therebetween; and the plates 66 and 78 define a process fuel inlet manifold 86 therebetween. The plugs 46 and the center tubes 24 abut the bottom plate 80; and the outer walls 22 of the reactors abut the plate 78.

Figure 3:
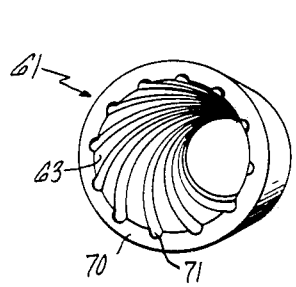
FIG. 3 is a perspective view of a radiator used in the catalytic reaction apparatus of FIG. 1.

For purposes of description, a radiator 61 is shown in FIG. 3 separate from the apparatus. As shown, a plurality of helical grooves 71 are formed in the inner surface 63 of each radiator 61. The helixes extend the full axial length of the radiator. It is preferred that each helix extend around a major portion of the inner circumference of said radiator (i.e. at least 180 degrees), and most preferably at least 360 degrees around the circumference. The holes 81 in the plate 62 have a diameter less than the outer diameter of the radiator but larger than or equal to the diameter of a circle circumscribing the helical grooves 71 to allow gases flowing in the grooves to exhaust directly into the manifold 64.

The total cross-sectional flow area of each volume 65 at any axial location must be sufficiently large such that the pressure drop through the volume 65 is acceptable for the particular application. If the area is too large heat transfer by convection to the radiator will decrease, and the flow distribution from reactor to reactor will suffer. If the area is too small the pressure drop might be too high for a specific application. Also, circumferential uniformity of heating of the reactor will suffer due to any incidental eccentricity of the radiator relative to the tube (i.e. eccentricity produces a larger percentage of localized area change due to small initial area).

Figure 4:
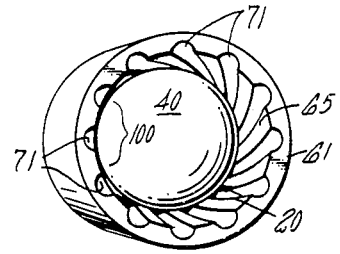
FIG. 4 is a top view of a reactor having a radiator disposed therearound which contacts the side of the reactor.

Aside from the total cross-sectional flow area, the percentage of the flow area which is created by the helical grooves must be a significant portion of the total flow area to prevent a serious maldistribution of the flow in the event a radiator 61 contacts the wall of the reactor. Such a situation is shown in FIG. 4 and can be created by a build up of tolerances, eccentricities, and out of roundness in a radiator and/or reactor. This situation is more likely to occur for large diameters and long tube lengths. In FIG. 4 the radiator 61 contacts a reactor 20 in the area 100; but the grooves 71 still permit a flow of hot gases in that area sufficient to maintain temperatures substantially uniform around the entire circumference of the reactor. It is believed the grooves should comprise at least 15 percent of the total cross-sectional flow area at any axial location and preferably at least 25 percent. The ability of the present apparatus to tolerate contact between the radiators and reactors permits the apparatus to be designed with large tolerances as well as relatively small gaps (nominal dimension) between the radiators and reactors to create the most desirable flow velocities. The acceptability of large tolerances is economically advantageous.

In operation, a mixture of steam and reformable hydrocarbon fuel from the manifold 86 enters the inlets 32 of the reaction chambers 26 by way of the holes 90 and the walls 22; the manifold 86 is fed by a conduit 92. The mixture immediately begins to be heated by the furnace gases flowing countercurrent thereto within the annular volumes 65, and begins to react in the presence of the catalyst particles 28. As the fuel, steam, and reaction products travel upward within the reaction chambers 26 they continue to react and pick up additional heat. At the outlets 36 the temperature of the reaction products reaches a maximum. The hot reaction products enter the inlets 49 of the regeneration chambers 48. As the reaction products traverse the length of the annular regeneration chambers, heat is transferred therefrom back into the reaction chambers 26. They thereupon enter the reaction products manifold 84 through the holes 94 in the center tubes 24, and are carried away from the reactors via the conduit 96 either for further processing, storage, or consumption.

Fuel for the furnace enters the manifold 16 via a conduit 98 and thereupon passes into the burner cavity 60 by way of the nozzles 14. Air enters the manifold 18 via a conduit 100 and enters the burner cavity 60 via annular passageways 102 surrounding each nozzle 14. Burning of the fuel and air takes place within the burner cavity 60. All of the hot gases within the burner cavity 60 must now travel through the volumes 65 and into the manifold 64. They are exhausted via the conduit 68.

As the burning gases give up heat to the reactors and as they move further away from the burner nozzles 14, their temperature drops. However, the high heat transfer effectiveness within the volumes 65 provides continued high heat transfer into the reactors 20 along the full length of the reactors 20. In addition to heat being transferred directly from the gases by convection due to direct contact between the gases and reactors, additional heat from the gases within the volumes 65 is transferred by convection to the radiators 61. The increased surface area provided by the helical grooves 71 enhances this convective heat transfer. This heat is then transferred by radiation from the radiators 61 into the reactors 20. This radiant heating is also enhanced by the increased surface area created by the grooves.

The fibrous packing material 73 between the radiators, as well as the radiators themselves, are preferably made from a low thermal conductivity material, such as a ceramic. This minimizes axial heat transfer losses through the packing material and through the radiator walls. During operation a substantially isothermal steady state condition exists within the furnace in any plane through the enhanced heat transfer portion 58 perpendicular to the radiator axes. That is, at any cross-section taken perpendicular to the radiator axis, the packing material and the radiator walls reach approximately the same temperature at steady state; and thereby a maximum amount of the heat transferred to the radiators from the furnace gases by convection will be radiated into the reactors. In this regard, it is preferred that the radiators be made from a material which has a high emissivity, preferably at least 20 percent and most preferably at least 50 percent. Ceramics for this purpose typically have emissivities of 50 percent and higher and are therefore preferred materials.

"Closely packed tubular reactors" as that phrase is used herein and in the claims, means a non-linear array of at least three closely spaced reactors wherein the array substantially fills the burner cavity volume and the reactors are substantially uniformly distributed and substantially uniformly spaced within the burner cavity volume and are closely spaced from each other.

Although in this exemplary embodiment the radiators are used in a catalytic reaction apparatus comprising closely packed tubular reactors, the radiator could also be used in a catalytic reaction apparatus having a single reactor; and such is contemplated as being within the scope of the present invention.

A single reactor 92 inches long and 9.0 inches in outer diameter was disposed within a test furnace volume. The lower half of the reactor was surrounded by a ceramic (made from alumina/silica fibers) radiator (emissivity 85%) having a 48 inch length, 11.5 inch outer diameter, and 9.4 inch inner diameter. The inner surface had twelve uniformly spaced apart helical grooves formed therein extending the length of the radiator. The pitch of each helical groove was 48 inches, the same as the length of the radiator. The cross-sectional shape of each groove was a 0.75 inch diameter semicircle. The total flow area between the radiator and reactor at any cross-section was about 8.5 $in^2$. The sum of the groove cross-sectional areas at any cross-section was 2.7 $in^2$. Thus the grooves provided about 32% of the cross-sectional flow area.

It should be understood by those skilled in the art that other various changes and omissions in the form and detail of the invention may be made without departing from the spirit and scope thereof.

I claim:

1. Catalytic reaction apparatus comprising a furnace including wall means defining a furnace volume, at least one tubular reactor disposed within said furnace volume, said at least one reactor including an outer cylindrical wall and further including catalyst disposed within said outer cylindrical wall;

means for introducing processed fuel into said at least one reactor;

means for conducting reaction products away from said at least one reactor;

means for providing hot gases within said furnace volume external of said at least one reactor; and at least one tubular radiator of high emissivity material fully surrounding at least a portion of the length of said at least one reactor and coaxial with said reactor, said at least one radiator including a generally cylindrical inner wall having means defining a plurality of adjacent helical channels therein, each of said helical channels extending the length of said radiator and around a major portion of the internal circumference of said radiator, wherein the sum of the cross-sectional areas of said plurality of helical channels of said at least one radiator at any cross-section taken perpendicular to a longitudinal axis of said radiator is at least 15 percent of the total cross-sectional flow area between said radiator and its respective reactor at the location of said cross-section, said catalytic reaction apparatus further comprising hot gas outlet means located such that all of the hot gases within said furnace-volume must pass between said at least one radiator and said at least one reactor in order to exit said furnace.

2. Catalytic reaction apparatus comprising a furnace including wall means defining a furnace volume having an upper portion which defines a burner cavity and a lower portion;
- a plurality of closely packed tubular reactors disposed within said furnace volume, each of said tubular reactors having an upper portion extending into said burner cavity and a lower portion, each of said tubular reactors also including an outer cylindrical wall and further including catalyst disposed within said outer cylindrical wall;
- means for intruducing processed fuel into each of said tubular reactors;
- means for conducting reaction products away from each of said tubular reactors;
- means for providing hot gases within said furnace volume external of said plurality of tubular reactors;
- a plurality of tubular radiators, each of said radiators having an emissivity of at least 50%, with each one of said radiators fully surrounding said lower portion of a respective one of said tubular reactors and coaxial with its respective reactor so as to define a flow area therebetween, each of said radiators including a generally cylindrical inner wall having means defining a plurality of adjacent helical channels therein, each of said helical channels extending the length of said radiator and around a major portion of the internal circumference of said radiator, wherein the sum of the areas of said plurality of helical channels of each radiator at a cross-section taken perpendicular to a longitudinal axis of said radiator is at least 15 percent of the flow area between said radiator and its respective reactor at the location of said cross-section, said catalytic reaction apparatus further comprising a hot gas outlet means located such that all of the hot gases within said furnace volume must pass from said burner cavity into and through the flow areas between said radiators and said reactors in order to exit said furnace; and
- fibrous packing material of low thermal conductivity filling the portion of the furnace volume between said plurality of radiators.

3. The catalytic reaction apparatus according to claim 6 wherein each of said plurality of tubular radiators is ceramic.

4. The catalytic reaction apparatus according to claim 2 wherein said packing material is ceramic.

5. The catalytic reaction apparatus according to claim 2 wherein the sum of the areas of said plurality of helical channels of each of said radiators at a cross-section taken perpendicular to said longitudinal axis is at least 25 percent of the flow area between each said radiator and its respective reactor at the location of said cross-section.

* * * * *

UNITED STATES PATENT AND TRADEMARK OFFICE
CERTIFICATE OF CORRECTION

PATENT NO. : 4,661,323

DATED : April 28, 1987

INVENTOR(S) : Ole L. Olesen

It is certified that error appears in the above-identified patent and that said Letters Patent is hereby corrected as shown below:

Cover Page: Item [73] should be inserted to read as follows:

-- Assignee: United Technologies Corporation
             Hartford, CT --.

Signed and Sealed this

First Day of December, 1987

*Attest:*

DONALD J. QUIGG

*Attesting Officer*  *Commissioner of Patents and Trademarks*